(12) United States Patent
Yang

(10) Patent No.: US 8,513,916 B2
(45) Date of Patent: Aug. 20, 2013

(54) WIRELESS CHARGING SYSTEM

(75) Inventor: Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 310 days.

(21) Appl. No.: 13/116,011

(22) Filed: May 26, 2011

(65) Prior Publication Data

US 2012/0126746 A1 May 24, 2012

(30) Foreign Application Priority Data

Nov. 23, 2010 (CN) .......................... 2010 1 0555220

(51) Int. Cl.
*H02J 7/00* (2006.01)
*H01F 27/42* (2006.01)

(52) U.S. Cl.
USPC .......................................... 320/108; 307/104

(58) Field of Classification Search
USPC .......................................... 320/108; 307/104
See application file for complete search history.

(56) References Cited

U.S. PATENT DOCUMENTS

| | | | |
|---|---|---|---|
| 5,001,400 A * | 3/1991 | Nilssen | 315/209 R |
| 5,157,319 A * | 10/1992 | Klontz et al. | 320/108 |
| 5,714,864 A * | 2/1998 | Rose et al. | 320/109 |
| 6,330,144 B1 * | 12/2001 | Lee et al. | 361/115 |
| 7,696,718 B2 * | 4/2010 | Suzuki | 320/108 |
| 7,893,564 B2 * | 2/2011 | Bennett | 307/104 |
| 7,990,103 B2 * | 8/2011 | Klinghult | 320/108 |
| 8,417,359 B2 * | 4/2013 | Tsai et al. | 700/22 |
| 2009/0075704 A1 * | 3/2009 | Wang | 455/573 |
| 2010/0164295 A1 * | 7/2010 | Ichikawa et al. | 307/104 |
| 2011/0018360 A1 * | 1/2011 | Baarman et al. | 307/104 |

* cited by examiner

Primary Examiner — M'Baye Diao
(74) Attorney, Agent, or Firm — Altis Law Group, Inc.

(57) ABSTRACT

A wireless charging system includes a charger and an electronic device. The charger includes a power input port including two input terminals for connecting to a power source and a power output port including two first metal sheets respectively connected to the two input terminals. The electronic device includes a power input port including two second metal sheets, a voltage conversion circuit connected to the two second metal sheets, a rectifier and filter circuit, and a battery. When the power output port of the charger is close to and faces the power input port of the electronic device. The two first metal sheets and the two second metal sheets form two capacitors, the power source provides power to the electronic device via the two capacitors and charges the battery after the power is processed by the voltage conversion circuit and the rectifier and filter circuit.

6 Claims, 2 Drawing Sheets

WIRELESS CHARGING SYSTEM

BACKGROUND

1. Technical Field

The present disclosure relates to charging systems and, particularly, to a wireless charging system.

2. Description of Related Art

Nowadays, electronic devices, such as mobile phones, digital cameras, have become more popular. However, the electronic devices on the market presently have many inconveniences for some users. For example, when a user wants to charge the electronic devices, a transmission line is often needed. Usually, the transmission line is long and easily intertwined, which brings inconvenience to the users.

Therefore, it is desirable to provide a wireless charging system to overcome the described limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
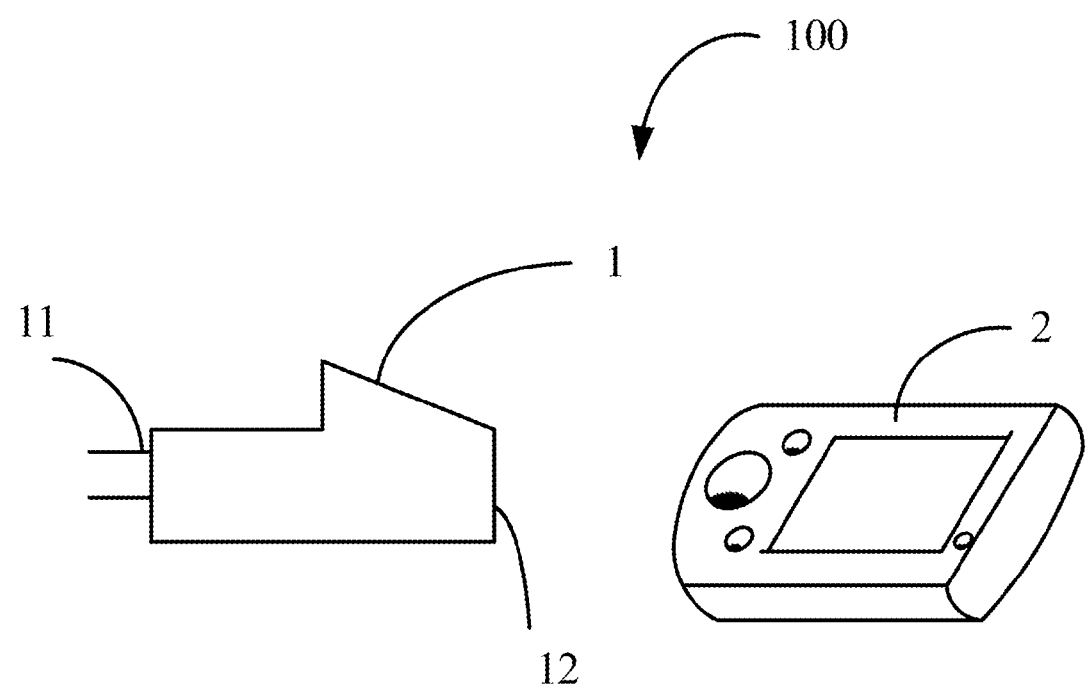
FIG. 1 is an isometric view of a wireless charging system, in accordance with an exemplary embodiment.
Figure 2:
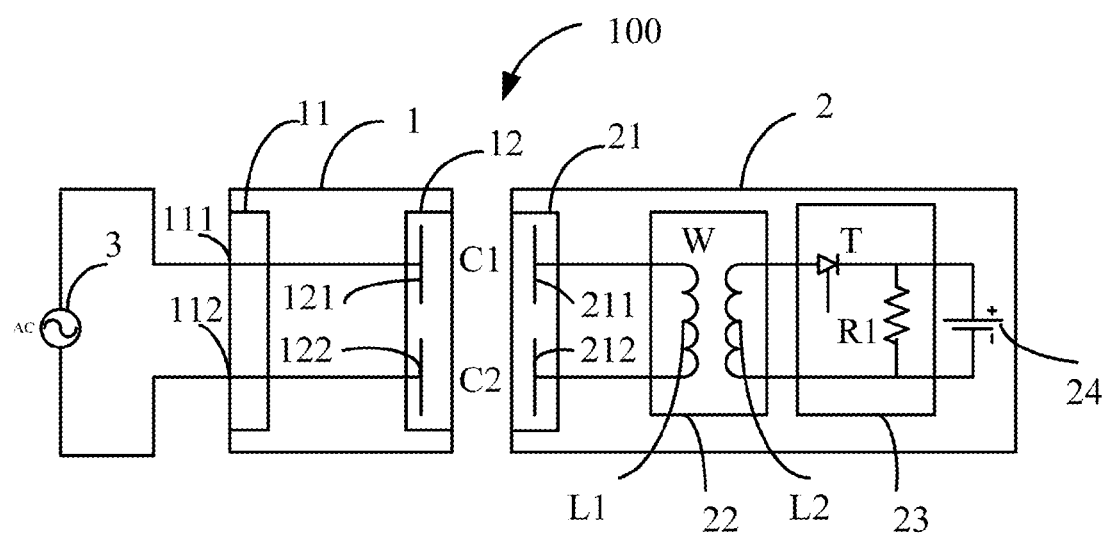
FIG. 2 is a circuit diagram of the wireless charging system of FIG. 1.

Referring to FIGS. 1 and 2, a wireless charging system 100 includes a charger 1 and an electronic device 2. The charger 10 includes a power input port 11 and a power output port 12. The power input port 11 is used to connect to a power source 3 (see FIG. 2), for example, a household power outlet. The electronic device 2 includes a power input port 21 (see FIG. 2). The charger 1 can charge the electronic device 2 when the power input port 11 of the charger 1 is connected to the power source 3 and the power output port 12 of the charger 1 is close to and faces the power input port 21 of the electronic device 2. In the embodiment, the electronic device 2 can be a mobile phone, a digital camera, or a digital photo frame.

Referring to FIG. 2, in the embodiment, the power input port 11 of the charger 1 is a plug for plugging into a socket (not shown) to receive the power source 3. The power input port 11 includes two input terminals 111 and 112. The power output port 12 of the charger 1 includes two metal sheets 121 and 122, which are respectively connected to the two input terminals 111 and 112. The electronic device 2 includes the power input port 21, a voltage conversion circuit 22, a rectifier and a filter circuit 23, as well as a battery 24. The power input port 21 includes two metal sheets 211 and 212, the voltage conversion circuit 22 is connected to the two metal sheets 211 and 212. The rectifier and filter circuit 23 is connected between the voltage conversion circuit 22 and the battery 24.

In the embodiment, the metal sheets 121, 122, 211, and 212 are made of metal with good conductivity, such as iron, copper, or silver. When the power output port 12 of the charger 1 is close to and faces the power input port 21 of the electronic device 2, the two metal sheets 121, 122 respectively face and are parallel to the two metal sheets 211, 212. It is well known, a capacitor is formed by sandwiching a non-conductor between two conductors, and air is a non-conductor, the metal sheets 121, 122, 211, and 212 are conductors. Therefore, as shown in FIG. 2, the metal sheet 121 of the power output port 12 and the metal sheet 211 of the power input port 21 sandwiches air to form a capacitor C1, and the metal sheet 122 of the power output port 12 and the metal sheet 212 of the power input port 21 sandwiches air to form a capacitor C2.

When the power input port 11 of the charger 1 connects to the power source 3, the voltage conversion circuit 22 of the electronic device 2 receives an alternating current voltage with a first voltage value from the power source 3 via the capacitor C1 and C2. The voltage conversion circuit 22 converts the alternating current voltage with the first voltage value output by the power source 3 to an alternating current voltage with a second voltage value. The second voltage value is much less than the first voltage value. The rectifier and filter circuit 23 converts the alternating current voltage with the second voltage output by the voltage conversion circuit 22 to a direct current voltage and charges the battery 24.

In the embodiment, the voltage conversion circuit 22 is a transformer W including a primary winding L1 and a secondary winding L2, the two metal sheets 211, 212 are respectively connected to two terminals (not labeled) of the primary winding L1. The rectifier and filter circuit 23 includes a rectifier T and a resistor R that are connected between two terminals (not labeled) of the secondary winding L2 in series. An anode (not labeled) and a cathode (not labeled) of the battery are respectively connected to two ends of the resistor R.

When the charger 1 connects to the power source 3, the power source 3 and the primary winding L1 forms a loop, the transformer W converts the alternating current voltage with the first voltage value output by the power source 3 to the alternating current voltage with the second voltage value. The rectifier T converts the alternating current voltage to direct current voltage and the two ends of the resistor R have a constant voltage and charge the battery 24.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A wireless charging system comprising:
   a charger comprising:
      a power input port comprising two input terminals for connecting to a power source; and
      a power output port comprising two first metal sheets respectively connected to the two input terminals; and
   an electronic device comprising:
      a power input port comprising two second metal sheets;
      a voltage conversion circuit connected to the two second metal sheets;
      a battery; and
      a rectifier and filter circuit connected between the voltage conversion circuit and the battery;
   wherein, when the power output port of the charger is close to and faces the power input port of the electronic device, the two first metal sheets and the two second metal sheets form two capacitors, and when the charger is connected to the power source, the voltage conversion circuit obtains an alternating current voltage with a first voltage value from the power source via the two capacitors, and the voltage conversion circuit converts the alternating current voltage with the first voltage value into an alternating current voltage with a second voltage value, and the rectifier and filter circuit converts the alternating current voltage with the second voltage value into direct current voltage and charges the battery.

2. The electronic device according to claim 1, wherein the voltage conversion circuit is a transformer comprising a primary winding and a secondary winding, two terminals of the primary winding are respectively connected to the two second metal sheets.

3. The electronic device according to claim 2, wherein the rectifier and filter circuit comprises a rectifier and a resistor which are connected between two terminals of the secondary winding, an anode and a cathode of the battery are respectively connected to two ends of the resistor.

4. The electronic device according to claim 1, wherein when the power output port of the charger is close to and faces the power input port of the electronic device, the two first metal sheets are respectively face and parallel to the two second metal sheets, one of the two first metal sheets and a corresponding one of the two second metal sheets sandwiches air to form a first capacitor, and the other of the two first metal sheets and the other of the two second metal sheets sandwiches air to form a second capacitor.

5. The electronic device according to claim 1, wherein the two first metal sheets and the two second metal sheets are made of icon, copper, or silver.

6. The electronic device according to claim 1, wherein the electronic device is a mobile phone, a digital camera, or a digital photo frame.

\* \* \* \* \*